(12) United States Patent
Hecht

(10) Patent No.: US 8,408,848 B2
(45) Date of Patent: Apr. 2, 2013

(54) ROTARY CUTTING TOOL AND CUTTING INSERT THEREFOR

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 493 days.

(21) Appl. No.: 12/833,674

(22) Filed: Jul. 9, 2010

(65) Prior Publication Data

US 2011/0013995 A1 Jan. 20, 2011

(30) Foreign Application Priority Data

Jul. 19, 2009 (IL) .......................................... 199936

(51) Int. Cl.
*B23B 27/22* (2006.01)
(52) U.S. Cl. ........................................ 407/115; 407/114
(58) Field of Classification Search .................... 407/64, 407/66, 67, 113, 114, 115, 116; *B23B 27/22*
See application file for complete search history.

(56) References Cited

U.S. PATENT DOCUMENTS

| | | | | |
|---|---|---|---|---|
| 4,606,678 A | * | 8/1986 | Zweekly | 407/114 |
| 4,626,140 A | * | 12/1986 | Zweekly et al. | 407/114 |
| 5,478,175 A | | 12/1995 | Kraemer | |
| 7,156,006 B2 | | 1/2007 | Hyatt et al. | |
| RE42,644 E | * | 8/2011 | Jonsson | 407/115 |

FOREIGN PATENT DOCUMENTS

| | | |
|---|---|---|
| JP | 6 023603 | 2/1994 |
| JP | 6-023603 | 2/1994 |
| RU | 2 198 767 | 2/2003 |
| WO | 2004/056515 | 7/2004 |

OTHER PUBLICATIONS

International Search Report in PCT/IL2010/000502, dated Oct. 29, 2010.

* cited by examiner

*Primary Examiner* — Daniel Howell
*Assistant Examiner* — Nicole N Ramos
(74) *Attorney, Agent, or Firm* — Womble Carlyle

(57) ABSTRACT

A cutting insert used in rotary cutting tools for performing turning spinning operations has an upper surface and an opposing base surface with a peripheral surface therebetween, the peripheral surface intersecting the upper surface to form a cutting edge. The cutting edge may be a continuous circular cutting edge. The upper surface has rotational asymmetry about an insert axis passing between the upper surface and the base surface, by virtue of having at least one spiral shaped protrusion with a chip deflection distance which continuously increases in a rotational direction about the insert axis for greater than 180°. The cutting insert is assembled to a cutting tool body having a shank portion and a cutting portion sharing a longitudinal axis, the insert axis being aligned with the longitudinal axis and the cutting insert secured in an insert receiving pocket of the cutting portion.

19 Claims, 3 Drawing Sheets

ROTARY CUTTING TOOL AND CUTTING INSERT THEREFOR

FIELD OF THE INVENTION

The present invention relates to cutting inserts, and cutting inserts used in rotary cutting tools for performing turning spinning operations in particular.

BACKGROUND OF THE INVENTION

Within the field of metal cutting operations using cutting tools with cutting inserts, developments have been made to perform a cutting operation where the cutting insert can be rotated about its own axis during engagement with a workpiece to provide a changing portion of its cutting edge without the need for stopping the cutting operation and indexing or replacing the cutting insert. This can avoid a build up of excessive heat at a specific point along the cutting edge which may cause rapid wearing and reduced life of the cutting insert.

U.S. Pat. No. 5,478,175 discloses a milling cutter having a plurality of cutting inserts, each assembled by means of a bushing and spring clip within a single cavity of a cutting tool, before the cutting tools are in turn mounted onto a tool holder. Each cutting insert has a shaft portion and a cylindrical shaped head of larger diameter with a circular cutting edge, and each cutting insert is free to rotate about its own axis within the cutting tool cavity. The top surface of the cutting insert includes a series of serrations and raised obstructions having rotational symmetry about the cutting insert axis, which come into contact with cutting chips being sheared from a stationary workpiece during a cutting operation. The interaction of the cutting chips with the serrations and raised obstructions induces rotation of the cutting insert about its axis causing a continuously changing portion of the cutting edge to engage the workpiece during a cutting operation.

U.S. Pat. No. 7,156,006 discloses a cutting tool assembly for turning operations having a single cutting insert rigidly secured to a tool holder and rotational about its own central axis. Several types of cutting insert are disclosed having continuous cutting edges formed at the intersection of a top surface and a side surface, with chip breaking features on the upper surface exhibiting rotational symmetry about the central axis. The cutting tool assembly is rotated at a predetermined speed by means of an external drive mechanism, which operates independently from a rotating workpiece and ensures that the cutting edge is consistently refreshed during a cutting operation, throughout a wide range of cutting conditions.

JP 6,023,603 discloses a cutting tool having a cylindrical shaped throwaway tip which rotates as a result of cutting resistance generated by contact with a rotating workpiece or by external means. One embodiment of this prior art publication discloses a throwaway tip with a chip breaker formed as a groove in its upper surface, having an elliptical shape in a top view, and exhibiting rotational symmetry. A chip deflection distance between the cutting edge and the chip breaker continuously changes as the throwaway tip rotates, varying from a maximum value to a minimum value and vice versa through 90° of rotation. Another embodiment of this prior art publication discloses a throwaway tip with a chip breaker formed as a groove in its upper surface, having an annular shape in a top view, and exhibiting rotational asymmetry. A chip deflection distance between the cutting edge and the chip breaker continuously changes as the throwaway tip rotates, varying from a maximum value to a minimum value and vice versa through 180° of rotation.

SUMMARY OF THE INVENTION

In accordance with the present invention, there is provided a cutting insert comprising:

an upper surface and an opposing base surface, with a peripheral side surface extending therebetween;

an insert axis extending between the upper surface and the base surface;

a cutting edge formed at the intersection of the peripheral side surface and the upper surface; and at least one chip breaking element formed on the upper surface, wherein:

the upper surface exhibits rotational asymmetry about the insert axis, and a chip deflection distance, measured radially between the cutting edge and an outermost point of the at least one chip breaking element, increases in a rotational direction about the insert axis for greater than 180°.

In accordance with preferred embodiments of the present invention, there is provided a rotary cutting tool comprising:

a cutting tool body having a shank portion and a cutting portion sharing a longitudinal axis, the cutting portion including an insert receiving pocket; and a cutting insert as defined above retained in the insert receiving pocket.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Figure 1:
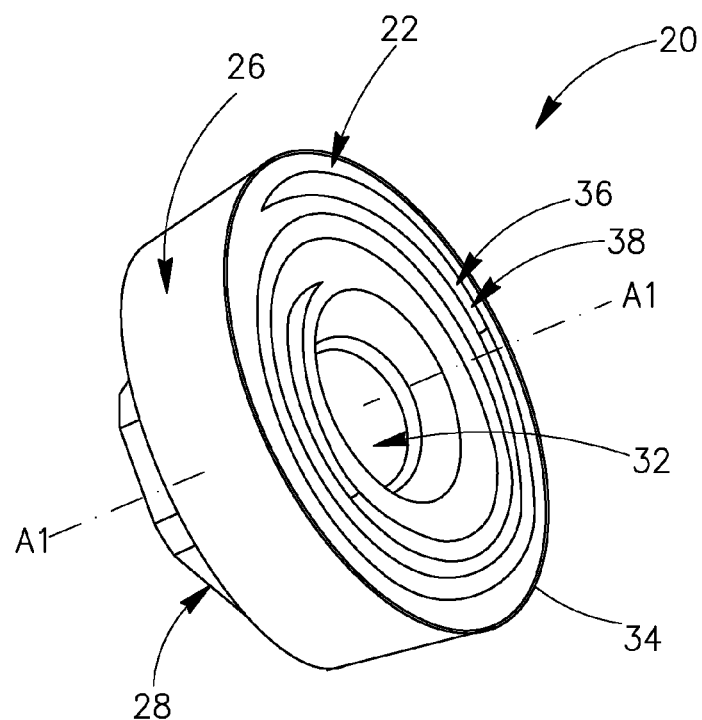
FIG. 1 is a top perspective view of a cutting insert in accordance with some embodiments of the present invention.
Figure 2:
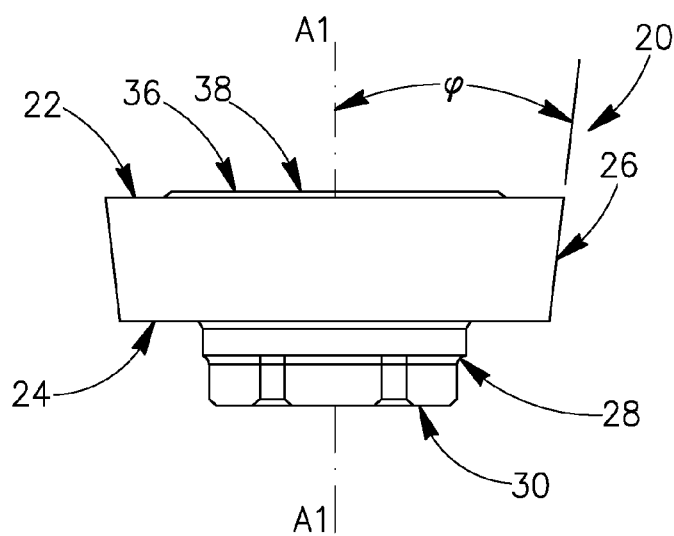
FIG. 2 is a side view of the cutting insert shown in FIG. 1.

Attention is first drawn to FIGS. 1 and 2, showing a single-sided cutting insert 20 in accordance with some embodiments of the present invention which may be manufactured by form pressing and sintering a cemented carbide, such as tungsten carbide, and may be coated or uncoated. The cutting insert 20 has an upper surface 22 and an opposing base surface 24 with a peripheral side surface 26 and an insert axis A1 extending therebetween. An engagement protrusion 28 may extend outwardly from the base surface 24 to a lower surface 30, and a clamping through bore 32 may extend and open out between the upper surface 22 and the lower surface 30.

In other embodiments of the present invention (not shown), the cutting insert 20 may have alternative engagement means, for example the base surface 24 may have a recess or a plurality of recesses as opposed to the engagement protrusion 28, and the cutting insert 20 may have alternative securing means, for example a male threaded portion on the engagement protrusion 28 as opposed to the clamping through bore 32.

As shown in FIGS. 1 and 2, the upper surface 22 and the peripheral side surface 26 intersect to form a cutting edge 34. In some embodiments, the cutting edge 34 and the peripheral side surface 26 may exhibit rotational symmetry about the insert axis A1.

In some embodiments, the cutting edge 34 may be continuous and circular, and the clamping through bore 32 may be co-axial with the insert axis A1.

Use of the term "rotational symmetry" throughout this specification describes a surface of a cutting insert which appears the same after a certain amount of rotation of the cutting insert about its axis.

Figure 3:
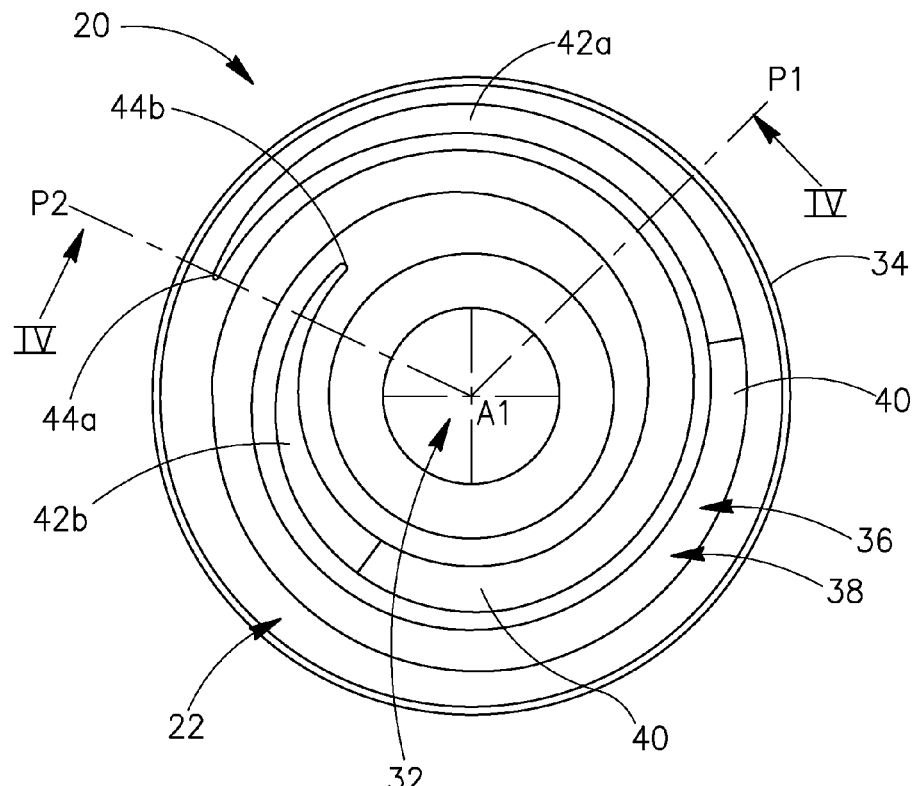
FIG. 3 is a top view of the cutting insert shown in FIG. 1.
Figure 4:
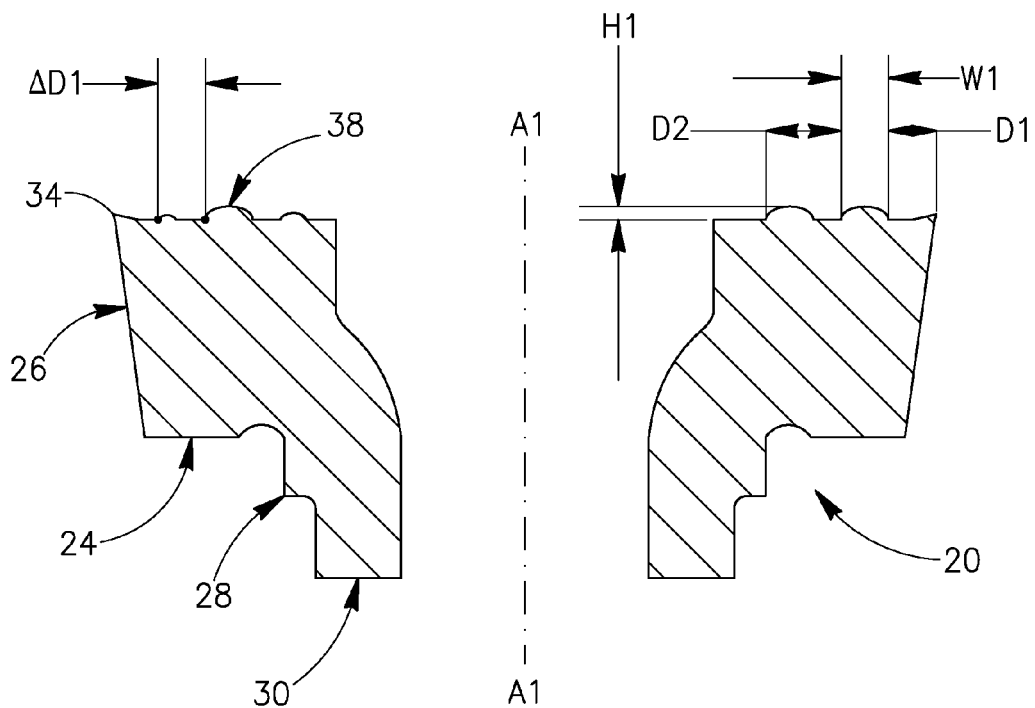
FIG. 4 is a cross-sectional view of the cutting insert shown in FIG. 3 taken along the line IV-IV.

As shown in FIGS. 3 and 4, the upper surface 22 exhibits rotational asymmetry about the insert axis A1 and has a chip breaking element 36 with a chip deflection distance D1 between the cutting edge 34 and the chip breaking element 36. The chip deflection distance D1 increases in a rotational direction about the insert axis A1 for greater than 180°, which in some embodiments constitutes greater than half the length of the cutting edge 34. In some embodiments, as shown in FIG. 3, the chip deflection distance D1 continuously increases in a clockwise direction between a first radial plane P1 and a second radial plane P2 for greater than 180°. The chip deflection distance D1 is measured radially between the cutting edge 34 and an outermost point of the chip breaking element 36, and each of the first and second radial planes P1, P2 contain the insert axis A1.

Use of the term "rotational asymmetry" throughout this specification describes a surface of a cutting insert which does not appear the same after any amount of rotation about the insert axis that is not a multiple of 360°.

In some embodiments of the present invention, the chip breaking element 36 may be in the form of a spiral shaped chip breaking projection 38 protruding from the upper surface 22, in a top view of the cutting insert 20.

In other embodiments of the present invention (not shown), the cutting insert 20 may have a spiral shaped chip breaking element 36 in the form of a chip breaking groove, and the chip deflection distance D1 may continuously increase in a counter-clockwise direction along greater than half the length of the cutting edge 34, in a top view of the cutting insert 20.

In further embodiments of the present invention (not shown), the upper surface 22 may exhibit rotational asymmetry about the insert axis A1 having several chip breaking elements 36, and the chip deflection distance D1 may discontinuously increase in a clockwise or counter-clockwise direction along greater than half the length of the cutting edge 34, in a top view of the cutting insert 20.

In some embodiments of the present invention, the peripheral side surface 26 may be frusto-conically shaped having a relief angle $\Phi$ typically between 0° and 15°, as shown in FIG. 2, thus providing the cutting insert 20 with a positive cutting geometry.

In other embodiments of the present invention (not shown), cutting insert 20 may have neutral or even negative cutting geometry, and in further embodiments (not shown), the cutting insert 20 may have an elliptical or polygonal shaped cutting edge.

In some embodiments of the present invention, the spiral shaped chip breaking projection 38 may have a convex shape in a cross-sectional view taken in the first radial plane P1, as shown in FIG. 4.

In some embodiments of the present invention, the spiral shaped chip breaking projection 38 may have a middle portion 40 and two end portions 42a, 42b, where the middle portion 40 has a constant projection height H1 and a constant projection width W1, extending from the first radial plane P1 in a clockwise direction for more than one spiral turn, as shown in FIG. 3.

In other embodiments of the present invention (not shown), the spiral shaped chip breaking projection 38 may have a middle portion 40 with a constant projection height H1 and a constant projection width W1 for a portion of one spiral turn.

In some embodiments of the present invention, the two end portions 42a, 42b may taper towards two respective end points 44a, 44b, the two end points 44a, 44b having a decreased projection height H1 and a decreased projection width W1. A first end portion 42a may taper in a counter-clockwise direction, as shown in FIG. 3, from the first radial plane P1 to a first end point 44a adjacent the cutting edge 34 on the second radial plane P2, where a chip deflection step change $\Delta$D1 occurs between the chip deflection distance D1 measured at the first end point 44a and the chip deflection distance D1 measured at the successive spiral turn.

In some embodiments of the present invention, the middle portion 40 of the chip breaking projection 38 may have a constant radial separation distance D2, where the radial separation distance D2 is measured between two corresponding points at successive turns of the middle portion 40 sharing the first radial plane P1.

It should be appreciated that although in some embodiments of the present invention, as shown in FIG. 3, where chip deflection distance D1 decreases in a clockwise direction between the second radial plane P2 and the first radial plane P1 due to the tapering effect of the first end portion 42a, other embodiments of the present invention may include an alternative first end portion 42a where the chip deflection distance D1 continuously increases in a clockwise direction along the whole length of the cutting edge 34, beginning and ending at the second radial plane P2.

Figure 5:
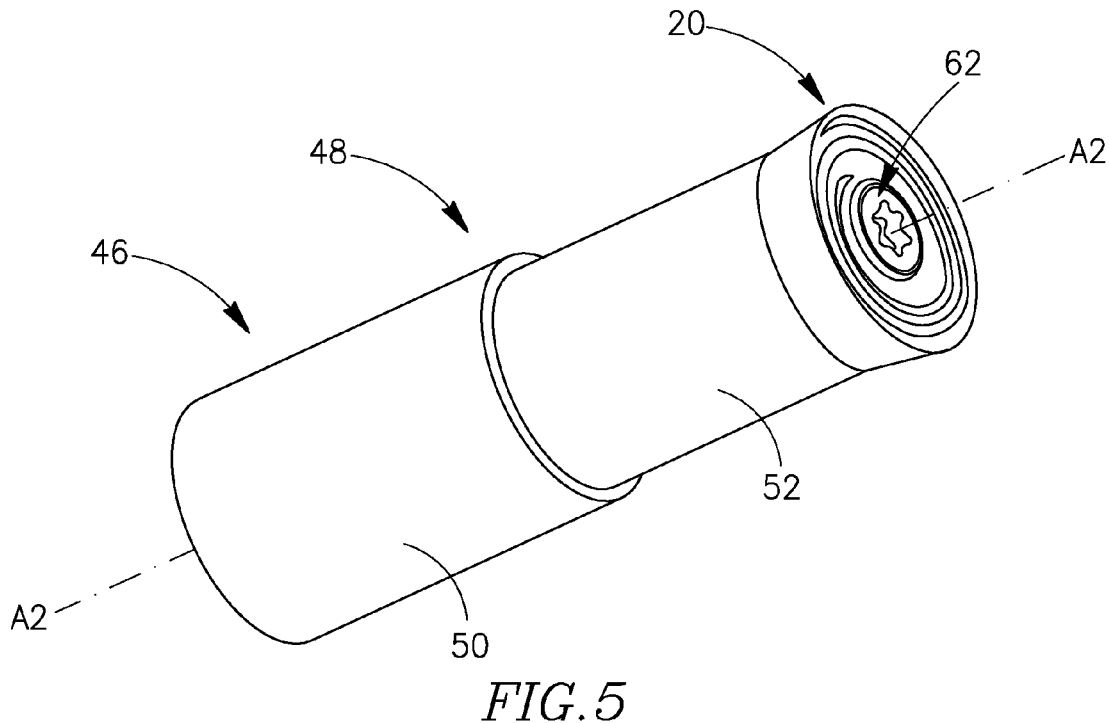
FIG. 5 is a perspective view of a rotary cutting tool in accordance with some embodiments of the present invention.
Figure 6:
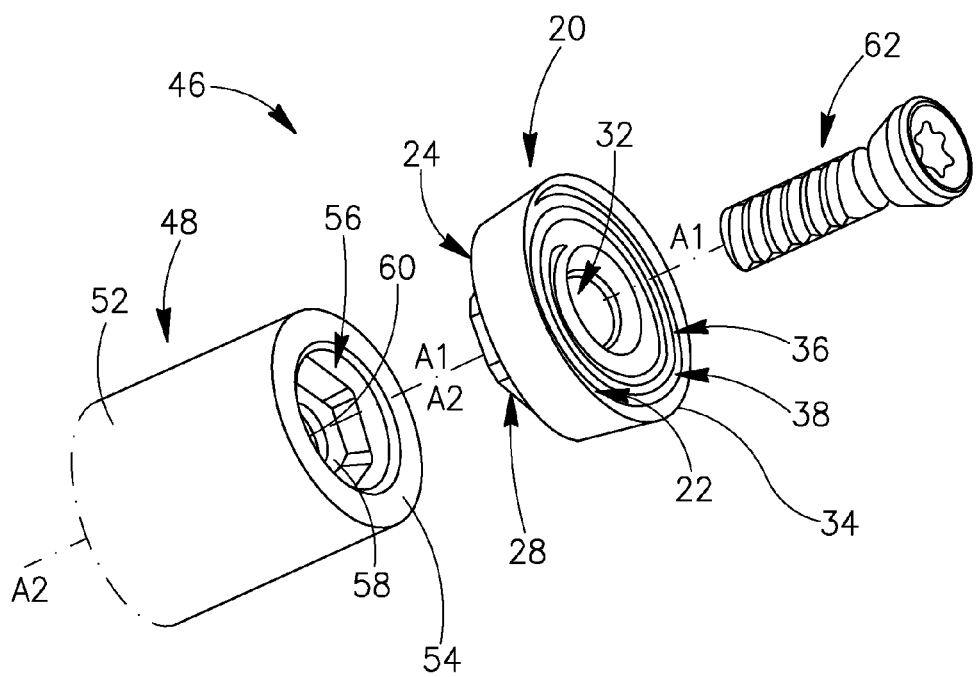
FIG. 6 is an exploded perspective view of a rotary cutting tool in accordance with some embodiments of the present invention.

Attention is drawn to FIGS. 5 and 6, showing a rotary cutting tool 46 in accordance with the present invention. The rotary cutting tool 46 includes a cutting tool body 48 which accommodates the cutting insert 20, and is primarily intended for use in turning spinning operations where the cutting insert 20 is rotated about the insert axis A1 at a predetermined speed when engaging a rotating workpiece (not shown).

The cutting tool body 48 may have a cylindrical shank portion 50 and a cylindrical cutting portion 52 sharing a common longitudinal axis A2 around which the rotary cutting tool 46 rotates. The cutting portion 52 may have an end surface 54 perpendicular to the longitudinal axis A2 including an insert receiving pocket 56 with a bottom surface 58 perpendicular to the longitudinal axis A2 and a threaded bore 60.

Assembly of the rotary cutting tool 46 is performed by initially aligning the insert axis A1 of the cutting insert 20 with the longitudinal axis A2 of the cutting tool body 48, and orienting the lower surface 30 of the engagement protrusion 28 in the direction of the bottom surface 58 of the insert receiving pocket 56. The cutting insert 20 may then be slidably inserted into the insert receiving pocket 56 until the base surface 24 of the cutting insert 20 comes into mating contact with the end surface 54 of the cutting portion 52. A fastening screw 62 may be inserted through the clamping through bore 32 and tightened into the threaded bore 60 to firmly secure the cutting insert 20 to the cutting tool body 48.

The rotary cutting tool 46 according to some embodiments of the present invention offers advantages of having a cutting insert 20 with a continuous cutting edge 34 and a continuously increasing chip deflection distance D1 along greater than half the length of the cutting edge 34 during turning spinning operations, thus providing improved chip breaking characteristics over a wider range of cutting depths.

Also, the rotary cutting tool 46 according to some embodiments of the present invention offers advantages of having a cutting insert 20 with a spiral shaped chip breaking element 36 and a chip deflection step change ΔD1 for each rotation of the cutting insert 20 during turning spinning operations, thus providing further improved chip breaking characteristics.

Although the cutting insert 20 according to some embodiments of the present invention has been described for use in turning spinning tool operations where both the workpiece (not shown) and the rotary cutting tool 46 rotate independently at predetermined speeds, it is conceivable that the cutting insert 20 may be secured in a non-rotating cutting tool body and used in regular turning operations to provide a number of different chip deflection distances at a number of index positions.

Although the present invention has been described to a certain degree of particularity, it should be understood that various alterations and modifications could be made without departing from the spirit or scope of the invention as hereinafter claimed.

What is claimed is:

1. A cutting insert (20), comprising:
   an upper surface (22) and an opposing base surface (24), with a peripheral side surface (26) extending therebetween;
   an insert axis (A1) extending between the upper surface (22) and the base surface (24);
   a cutting edge (34) formed at the intersection of the peripheral side surface (26) and the upper surface (22); and
   at least one chip breaking element (36) formed on the upper surface (22),
   wherein:
   the upper surface (22) exhibits rotational asymmetry about the insert axis (A1), and
   a chip deflection distance (D1), measured radially between the cutting edge (34) and an outermost point of the at least one chip breaking element (36), increases in a rotational direction about the insert axis (A1) for greater than 180°.

2. The cutting insert (20) according to claim 1, wherein the chip deflection distance (D1), increases along greater than half the length of the cutting edge (34).

3. The cutting insert (20) according to claim 1, wherein the cutting edge (34) exhibits rotational symmetry about the insert axis (A1).

4. The cutting insert (20) according to claim 1, wherein the peripheral side surface (26) exhibits rotational symmetry about the insert axis (A1).

5. The cutting insert (20) according to claim 1, wherein the cutting edge (34) is continuous.

6. The cutting insert (20) according to claim 1, wherein the cutting edge (34) is circular.

7. The cutting insert (20) according to claim 1, wherein the chip deflection distance (D1) continuously increases about the insert axis (A1) for greater than 180°.

8. The cutting insert (20) according to claim 1, wherein the at least one chip breaking element (36) is spiral shaped in a top view of the cutting insert (20).

9. The cutting insert (20) according to claim 8, wherein the at least one chip breaking element (36) is in the form of a chip breaking projection (38) protruding from the upper surface (22).

10. The cutting insert (20) according to claim 9, wherein the at least one chip breaking projection (38) is convex shaped in a cross-sectional view taken in a first radial plane (P1) containing the insert axis (A1).

11. The cutting insert (20) according to claim 10, wherein the at least one chip breaking projection (38) has a middle portion (40) and two end portions (42a, 42b), wherein the two end portions (42a, 42b) have two respective end points (44a, 44b), and wherein the middle portion (40) has a constant projection height (H1) and a constant projection width (W1) for at least a portion of one spiral turn.

12. The cutting insert (20) according to claim 11, wherein at least one of the two end portions (42a, 42b) is tapered, leading to a decrease in the projection height (H1) and a decrease in the projection width (W1) towards at least one of the two respective end points (44a, 44b).

13. The cutting insert (20) according to claim 11, wherein a chip deflection step change (ΔD1) occurs between the chip deflection distance (D1) measured at a first end point (44a) adjacent the cutting edge (34) and the chip deflection distance (D1) measured at the successive spiral turn.

14. The cutting insert (20) according to claim 11, wherein a radial separation distance (D2) between successive turns of the middle portion (40) of the at least one chip breaking projection (38) is constant, the radial separation distance (D2) being measured in the first radial plane (P1) between two corresponding points at successive turns of the middle portion (40) of the at least one chip breaking projection (38).

15. A rotary cutting tool (46), comprising:
   a cutting tool body (48), comprising a shank portion (50) and a cutting portion (52) sharing a longitudinal axis (A2), the cutting portion including an insert receiving pocket (56); and
   a cutting insert retained in the insert receiving pocket, wherein the cutting insert comprises:
      an upper surface (22) and an opposing base surface (24), with a peripheral side surface (26) extending therebetween;
      an insert axis (A1) extending between the upper surface (22) and the base surface (24);
      a cutting edge (34) formed at the intersection of the peripheral side surface (26) and the upper surface (22); and
      at least one chip breaking element (36) formed on the upper surface (22),
      wherein:
      the upper surface (22) exhibits rotational asymmetry about the insert axis (A1), and
      a chip deflection distance (D1), measured radially between the cutting edge (34) and an outermost point of the at least one chip breaking element (36), increases in a rotational direction about the insert axis (A1) for greater than 180°.

16. The rotary cutting tool (46) according to claim 15, wherein the insert axis (A1) is aligned with the longitudinal axis (A2).

17. The rotary cutting tool (46) according to claim 15, wherein the chip deflection distance (D1), increases along greater than half the length of the cutting edge (34).

18. The rotary cutting tool (46) according to claim 15, wherein the cutting edge (34) exhibits rotational symmetry about the insert axis (A1).

19. The rotary cutting tool (46) according to claim 15, wherein the peripheral side surface (26) exhibits rotational symmetry about the insert axis (A1).

* * * * *